March 21, 1939. F. R. STAMP 2,151,282
MANUFACTURE OF FROZEN CONFECTIONS
Filed May 9, 1938
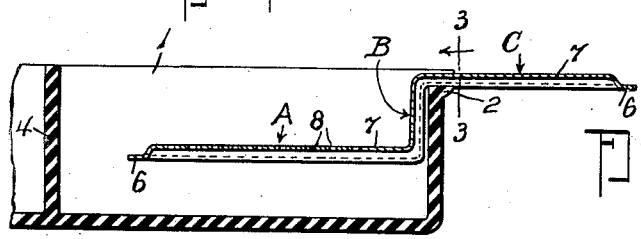
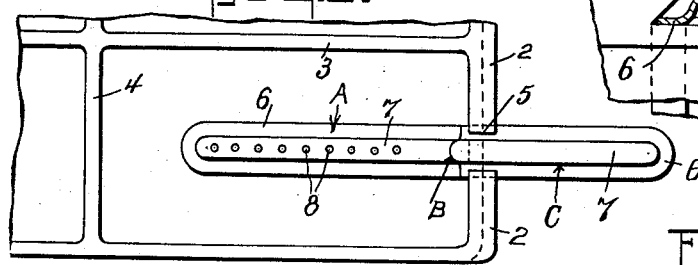
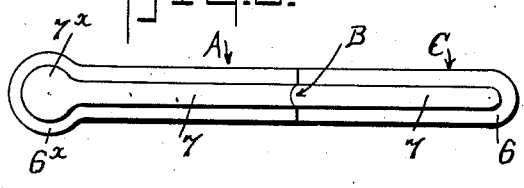
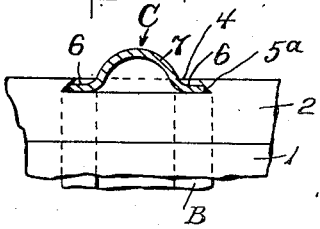
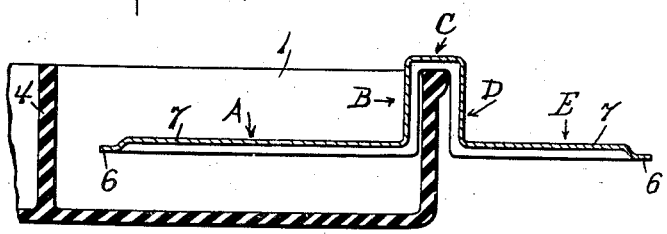
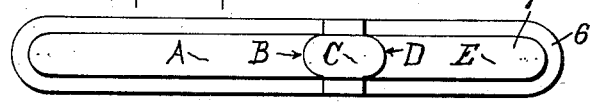
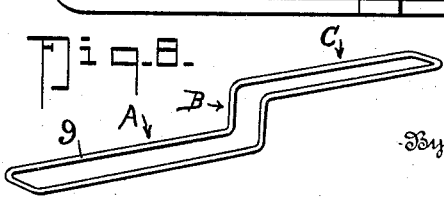
Inventor
Floyd R. Stamp
Albert E. Dieterich
and
Theodore H. Rutley
By
Attorneys Patented Mar. 21, 1939

2,151,282

UNITED STATES PATENT OFFICE 2,151,282

MANUFACTURE OF FROZEN CONFECTIONS

Floyd R. Stamp, Wabash, Ind.

Application May 9, 1938, Serial No. 206,874

9 Claims. (Cl. 107—19)

My invention relates to the art of making frozen confections in which the confection is frozen on a stick or handle.

Further, the invention relates more specifically to the making of "popsicles" in the chiller of a household mechanical refrigerator, such as the "Frigidaire".

The present invention particularly has for its object to provide means whereby the confection can be made in compartment trays constructed either of metal (rigid) or of rubber (flexible) without materially altering their construction.

Again, it is an object to provide an improved stick to cooperate with the pan in maintaining that part of the stick on which the confection is frozen in proper position in the tray while the liquid congeals around the stick and freezes thereto.

Other objects will in part be obvious and in part be pointed out hereafter.

To the attainment of the aforesaid objects and ends the invention still further resides in the novel details of construction, combination and arrangement of parts, all of which will be first fully described in the following detailed description and then be particularly pointed out in the appended claims, reference being had to the accompanying drawing, in which:—

Fig. 1 is a detail vertical longitudinal section with one form of my invention applied.

Fig. 2 is a top plan view of the same.

Fig. 3 is an enlarged cross section on the line 3—3 of Fig. 1.

Fig. 4 is a view similar to Fig. 3, showing a modification hereinafter again referred to.

Fig. 5 is a detail plan view of a modified form of stick.

Fig. 6 is a view similar to Fig. 1, showing in vertical longitudinal section a further modification of the invention.

Fig. 7 is a plan view of the handle or stick.

Fig. 8 is a detail perspective view of another modification later referred to.

In the drawing, in which like numbers of reference designate like parts in all the figures, I represents the tray which has longitudinal partitions 3 and cross partitions 4 dividing the same into pockets in which the liquid to be frozen is placed.

In the preferred form of the invention the stick on which the frozen confection is formed comprises an elongated body having a flat margin 6 and a central concavo-convex portion 7, the body being bent at right angles at a suitable place between its ends so as to provide a horizontal section A to lie within a pocket of the tray parallel to the bottom thereof, a vertical section B to lie against a vertical wall of the tray and a section C to lie over the reinforced edge 2 of the tray.

The edge of the tray is preferably provided with a dove-tail slot 5 for each pocket, in which slot the section C of the stick can be placed and held by retaining friction produced by the resiliency of the tray wall. The slot 5 may be deep enough to embed the entire cross-section of the stick (see Fig. 3) or it may be shallow so as to receive only the flange or flat portion 6—6 of the stick (see Fig. 4).

Since the concavo-convex portion of the stick is bound by the flange 6 at the end of section A, as well as along its sides, the frozen material will be held "locked" to the stick. To aid this locking the stick may be provided with holes 8 and/or an enlarged end 7$^x$—6$^x$ (see Fig. 5).

For use with rigid trays, or even flexible trays having no slots 5 in their edges, the stick may be bent as at B, C, D, to form two horizontal sections A and E connected by an inverted U-shaped portion composed of the sections B—C—D, the sections B and D lying close to the wall of the tray and serving as a means to hold the stick in proper position (see Figs. 6 and 7).

The stick may be made of sheet metal, pressed pulp, wood or other suitable substance. The handle may also be made of wire or reed 9 (see Fig. 8) formed in a closed elongated loop with parallel sides and bent to form the section A—B—C.

From the foregoing description, taken in connection with the accompanying drawing, it is thought that the construction, use and advantages of the invention will be clear to those skilled in the art.

What I claim is:—

1. In the art of frozen-confection making, a freezing tray having pockets, a stick comprising a section to lie within a pocket and spaced from the walls of the pocket, another section to lie over an edge of the tray, and a connecting section lying parallel and adjacent to the wall of the tray over whose edge said another section lies, said connecting section being shorter than said first mentioned section and serving to connect said first mentioned section to said another section, said another section constituting a handle by which the frozen confection may be manipulated.

2. In the art of frozen-confection making, a freezing tray having pockets, a stick comprising a section to lie within a pocket, another section to lie over an edge of the tray, and a connecting section lying parallel and adjacent to the wall of the tray over whose edge said another section lies, said tray being composed of resilient material and having said edge provided with a recess to receive said stick and hold it to the edge by retaining friction.

3. In the art of frozen-confection making, a freezing tray having pockets, a stick comprising a section to lie within a pocket, another section to lie over an edge of the tray, and a connecting section lying parallel and adjacent to the wall of the tray over whose edge said another section lies, said stick comprising a body having a longitudinal concavo-convex portion bound by a plane flange.

4. In the art of frozen-confection making, a freezing tray having pockets, a stick comprising a section to lie within a pocket, another section to lie over an edge of the tray, and a connecting section lying parallel and adjacent to the wall of the tray over whose edge said another section lies, said stick comprising a body having a longitudinal concavo-convex portion bound by a plane flange, said tray having a dove-tail slot in its upper edge to receive and hold said stick.

5. In the art of frozen-confection making, a freezing tray having pockets, and a stick comprising two parallel sections united by an inverted U-shaped section, the latter being shaped to fit over the edge of the tray and lie adjacent the wall of the same to hold one of the parallel sections within a pocket of the tray and spaced between the bottom and top of the tray.

6. In the art of frozen-confection making, a freezing tray having pockets, and a stick comprising two parallel sections united by an inverted U-shaped section, the latter being shaped to fit over the edge of the tray and lie adjacent the wall of the same to hold one of the parallel sections within a pocket of the tray and spaced between the bottom and top of the tray, said stick comprising a longitudinally extending concavo-convex rib surrounded by a plane flange.

7. In the art of frozen-confection making, a freezing tray having pockets, a stick comprising a section to lie within a pocket, another section to lie over an edge of the tray, and a connecting section lying parallel and adjacent to the wall of the tray over whose edge said another section lies, said stick comprising a body having a longitudinal concavo-convex portion bound by a plane flange, that section of the stick which lies within the pocket having an enlarged end.

8. In the art of frozen-confection making, a freezing tray having pockets, a stick comprising a section to lie within a pocket, another section to lie over an edge of the tray, and a connecting section lying parallel and adjacent to the wall of the tray over whose edge said another section lies, said stick comprising a body having a longitudinal concavo-convex portion bound by a plane flange, that section of the stick which lies within the pocket having an enlarged end, and having its concavo-convex portion perforated.

9. In the art of frozen-confection making, a freezing tray having pockets, and a stick comprising two parallel sections united by an inverted U-shaped section, the latter being shaped to fit over the edge of the tray and lie adjacent the wall of the same to hold one of the parallel sections within a pocket of the tray and spaced between the bottom and top of the tray, said stick comprising an elongated wire loop shaped to provide the sections aforesaid.

FLOYD R. STAMP.